United States Patent [19]
McDonnell

[11] 3,832,000
[45] Aug. 27, 1974

[54] VEHICLE SAFETY SYSTEM

[76] Inventor: Leo G. McDonnell, 19917 Kinloch, Detroit, Mich. 48240

[22] Filed: Jan. 4, 1973

[21] Appl. No.: 320,991

[52] U.S. Cl. ............ 296/65 A, 280/150 B, 297/216
[51] Int. Cl. .......................................... B60r 21/08
[58] Field of Search ............... 296/65 A; 280/150 B; 297/216

[56] References Cited
UNITED STATES PATENTS

| | | | |
|---|---|---|---|
| 2,660,222 | 11/1953 | Woodsworth | 280/150 B |
| 2,735,476 | 2/1956 | Fieber | 296/65 A |
| 3,695,629 | 10/1972 | Schlanger | 296/65 A |

*Primary Examiner*—David Schonberg
*Assistant Examiner*—John A. Pekar
*Attorney, Agent, or Firm*—William L. Fisher, Esq.

[57] ABSTRACT

In a vehicle safety system for achieving vehicle safety for occupants upon collision of the vehicle, vehicle safety method comprising providing a force capable of moving a vehicle seat and any occupant thereof axially of the vehicle, latching the vehicle seat against the axial movement, latching both a spring powered pulling force and a fluid powered pulling force, both said last-mentioned pulling forces operative upon each other to augment their individual pulling forces, said last-mentioned pulling forces capable of being latched against operation, latching said last-mentioned pulling forces against operation until a collision of the vehicle occurs, sensing a collision of said vehicle, simultaneously unlatching in response to said sensing both the last-mentioned pulling forces upon the happening of the collision, and utilizing the operation of at least one of the last-mentioned pulling forces to unlatch the vehicle seat so that the latter can be moved axially of the vehicle by the force thereon.

18 Claims, 21 Drawing Figures

PATENTED AUG 27 1974

3,832,000

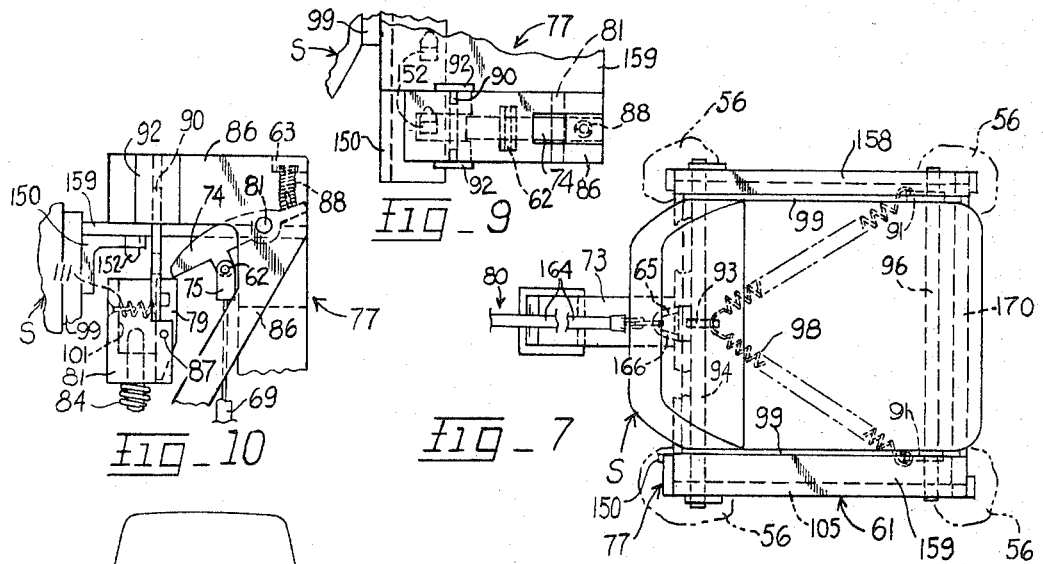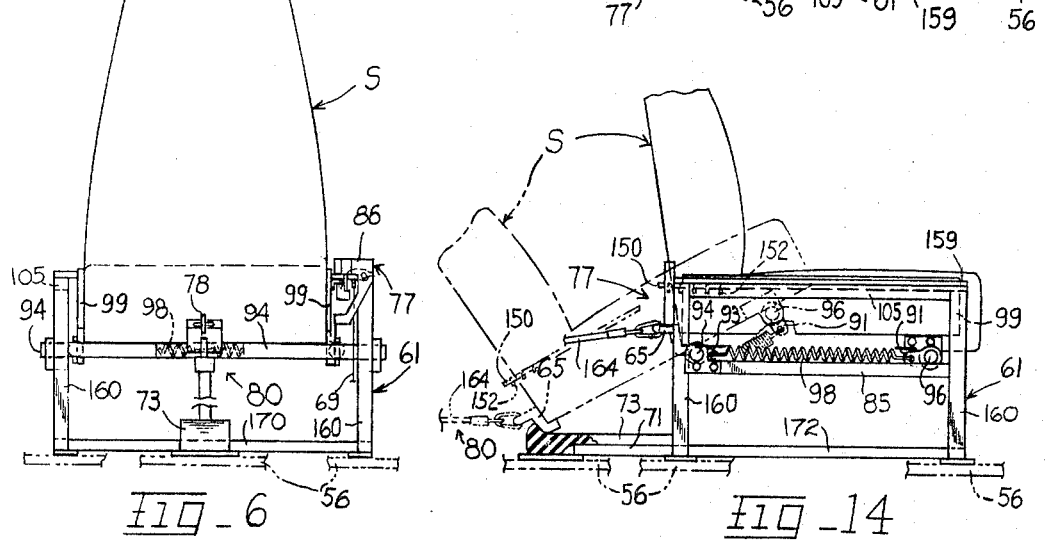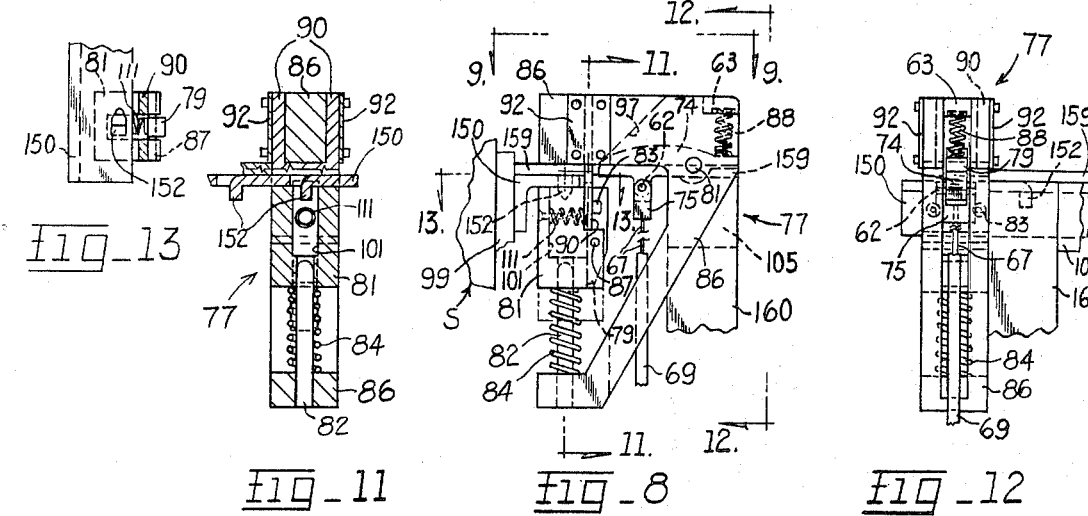

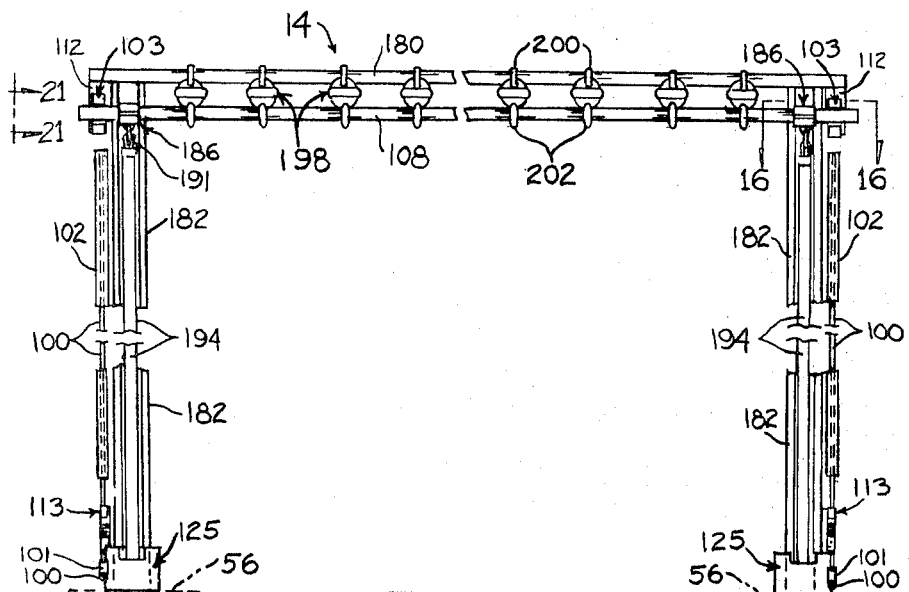
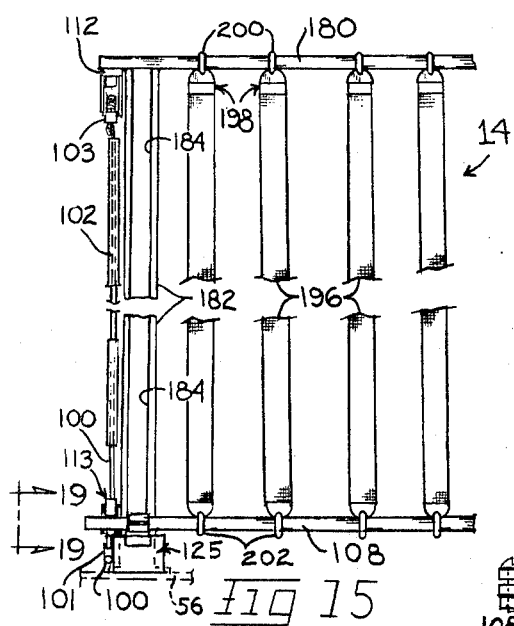
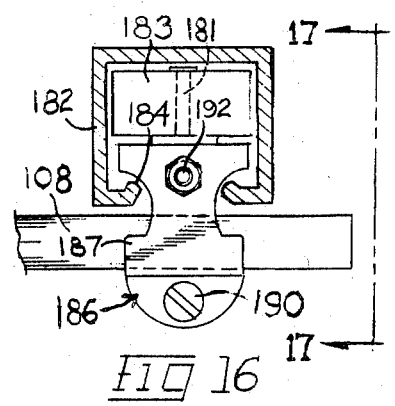
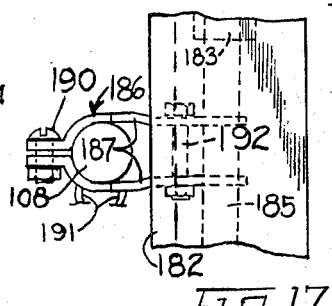

VEHICLE SAFETY SYSTEM

My invention relates to a vehicle safety system which employs a latched power unit to achieve vehicle safety for occupants upon collision of the vehicle.

I have heretofore provided latched power units. (See my prior U.S. Pats. No. 2,781,600 and 3,600,921 issued Feb. 19, 1957 and May 9, 1972, respectively.) I have since invented certain improvements in respect to my last patented latched power unit which pertain, inter alia, to modifying said power unit so that it is capable of initiating actuation of certain other latched power units I have combined with my said power unit for achieving vehicle safety for occupants upon such collision.

The principal object of my invention is the provision of a vehicle safety system which employs my improved latched power unit in combination with certain other latched power units for achieving vehicle safety for occupants upon collision of a vehicle.

The foregoing object of my invention and the advantages thereof will become apparent during the course of the following description, taken in conjunction with the accompanying drawings, in which:

FIGS. 1 and 2 are, respectively, side elevational and top plan views of a vehicle safety system embodying my invention;

FIGS. 4 and 5 are, respectviely, fragmentary side elevational and top plan views of the structures of FIGS. 1 and 2, respectively, showing parts thereof in different operative positions.

FIGS. 14, 6 and 7 are, respectively, side and rear elevational and top plan views of a vehicle seat moving means embodying my invention and employed in my vehicle safety system;

FIGS. 8-13 are, respectively, fragmentary rear elevational, top plan, rear elevational, vertical sectional, side elevational and top plan views of said vehicle seat moving means.

FIGS. 18 and 15 are respective front elevational views showing different positions of a safety curtain unit embodying my invention and employed in my vehicle safety system;

FIG. 16 is a fragmentary horizontal sectional view of the structure of FIG. 18 taken on the line 16—16 thereof;

FIG. 17 is a fragmentary and elevational view of the structure of FIG. 16 taken on the line 17—17 thereof;

Figure 21:
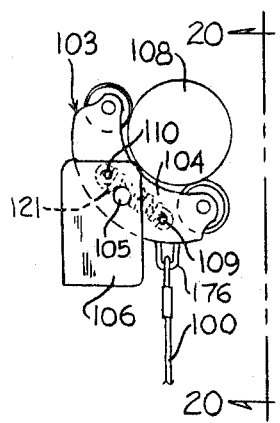
Figure 20:
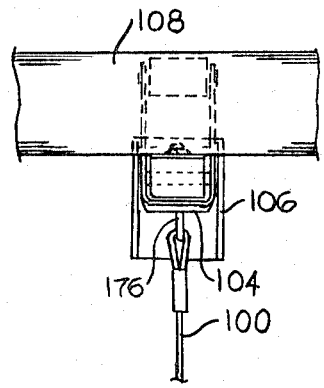
Figure 19:
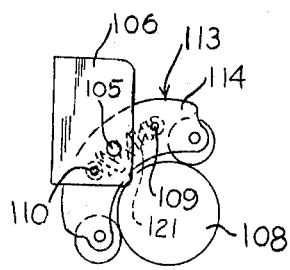

FIGS. 21 and 19 are fragmentary end elevational views of the structure of FIGS. 14 and 15, respectively, taken on the lines 21—21 and 19—19 thereof; and FIG. 20 is a fragmentary end elevational view of the structure of FIG. 21 taken on the line 20—20 thereof;

Referring to the drawings in greater detail, 10 generally designates said latched power unit which, in the instance, is used for power actuating a vehicle seat latch 77 to release position to initiate actuation of other latched power units within a vehicle to achieve vehicle safety for the occupant of a vehicle seat upon collision of the vehicle. Upon release of said latch 77 a vehicle seat S is power actuated to move rearwardly and to rock backwardly by a vehicle seat power unit 80. After a predetermined amount of rearward movement of said vehicle seat S a vehicle safety curtain 14 is thrown down in front of the occupant of said vehicle seat S by a pair of latched power units 125 to prevent him from going through the vehicle windshield or from striking other parts of the vehicle. If said occupant strikes anything in front of him it will be said safety curtain 14 which will safely catch and arrest his forward movement to prevent serious harm to him.

Said power unit 10 of my present invention is similar in operation to that shown and described in my said last U.S. Pat. No. 3,660,921 in that both a spring powered power train 24 and a fluid powered power train 32 are employed except that in the present power unit 10 the fluid powered power train 32 is connected to said latch 77 for power actuating the latter to release position. Also the male and female latch elements 40 and 43, respectively, of the spring powered power train 24 are used in a different way in the present power unit 10 in that they are employed as a lock for the entire vehicle safety system. Such lock, while shown in its unlocked position in the drawings, is manually engageable by a vehicle occupant via a handle 157 made fast to the female latch element 43 so that said occupant can manually rotate (counter-clockwise as viewed in FIG. 2) the latch element 43 against the tension of the spring 44 about its pivot connection 51 so as to engage the same with said male latch element 40 to prevent movement of the platform 26 about its pivot connection 50, whereby to prevent actuation of the spring powered power train 24 so as to render said vehicle safety system inoperative under circumstances selected by the vehicle operator.

The present power unit 10 is mounted in a horizontal position on stationary parts 56 of the vehicle via mounting members 53 and 54 which are made fast, respectively, to the rear ends of the the fluid powered power unit 32 and the stationary member 16 (being the principal supporting means for the spring powered power unit 24) and to the front end of said member 16. When not locked against operation, the spring powered power train 24 is latched by a trigger mechanism 30 which latter mechanism 30 is arranged on the vehicle at a location remote from said power unit 10, as at the front end of the vehicle in front of the front bumper 78 thereof as shown, so as to be actuated upon front end collision of the vehicle. A moveable member 23 which has a force-applying projection 29 thereon is slidably mounted in respect to said front vehicle bumper structure 78 and projects in front thereof so as to be struck upon front end collision of the vehicle prior to the time the front bumper structure is actually struck. The amount by which the member 23 projects in front of the vehicle bumper structure 78 is adjustable by well known means so that the time interval between triggering of the present power unit 10 and actual impact with the vehicle can be varied. There is such a time interval which is optimum for the particular hardware which is assembled to practice my invention. The member 23 may be otherwise actuated upon collision of the vehicle by other means known in present art.

Said trigger mechanism 30 comprises a housing 55 fastened to a stationary part 56 of the vehicle having an integral projecting portion 57 which housing 55 pivotally supports, as at 58, a moveable lever 59 normally urged to rotate about its pivot connection 58 in a counter-clockwise direction as shown in the drawings by a compression spring 49. One end of a moveable flexible cable 66 is connected to the upper end of the lever 59 which cable 66 is longitudinally slidable in a stationary flexible sheath 68. Said sheath 68 is made fast to suitable stationary sheath mounting structures 70 and to the top of the housing 55. The other end of the cable 66 is connected to a clevis 72 pivotally connected to the platform 26 so that cocking of the lever 59 occurs by manually rotating the lever 59 clockwise against the urging of the tension spring 25 of the spring powered power train 24 as well as against the urging of the compression spring 49. Simultaneously the lever 59 is latched by a latch member 60 as will be described. Both said springs 25 and 49 have adjustment means for varying the respective application forces thereof and that for spring 49 is designated 156.

In the present power unit 10 the fluid powered power train 32 is manually cocked subsequent to cocking of the trigger mechanism 30 and via a handle 52 (made fast to the female latch element 45) by forcefully extending the piston rod 46 against the compression of air which takes place in the pneumatic cylinder 34 and at the same time by pivoting the female latch element 45 (clockwise as shown in the drawings) until the latter engages the male latch element 42.

Said lever 59 is held in its cocked position by said latch member 60 which is pivotally carried, as at 62, on the lower end of said lever 59. Said latch member 60 has a looped end thereon by which it holds the moveable handle 59 in its cocked position which looped end is moveable over the lower free end of the portion 57 against the tension of a spring 64 during cocking of said trigger mechanism 30. The tension spring 64 which is connected between the looped end of the latch member 60 and the lower end of the handle 59 operates to pull said latch member 60 free of the portion 57 upon clockwise rotation of the lever 59 by being struck by the member 23 upon collision of the vehicle (as shown in FIG. 4). Thereupon the compression spring 49 throws the lever 50 counter-clockwise as shown in the drawings out of its cocked position and causes the cable 66 to move longitudinally in its sheath 68 to push upon the platform 26 to commence rotation of the latter on its pivot connection 50 (counter-clockwise as shown in FIG. 2) to simultaneously initiate respective power strokes of both the spring powered power unit 24 and the fluid powered power unit 32 which together forcefully continue such rotation of the platform 26 to disengage the male latch element 42 from the female latch element 45. A stricker plate 95 made fast to an end of the tube 22 aids in disengaging said latch elements 42 and 45 from each other by pushing against said female latch element 45 while the platform 26 is being rotated counter-clockwise.

One end of a moveable flexible cable 67 is connected to the piston rod 46 by a laterally and downwardly projecting member 158 and the other end thereof is connected to a moveable lever 74 (being a part of said vehicle seat latch 77) by a clevis 75 pivotally connected, as at 62, to said lever 74 which latter in turn is pivotally connected, as at 81, to a frame 86 for said vehicle seat latch 77. Said cable 67 is longitudinally slidable in a stationary flexible sheath 69 made fast to suitable stationary sheath mounting structures 70. In the power stroke of the fluid powered power unit 32 the cable 67 is pulled rearwardly toward the pneumatic cylinder 34 and downwardly to forcefully rotate the lever 74 about its pivot connection 81 against the urging of a compression spring 88 to strike a member 79 (being a part of said vehicle seat latch 77).

Said seat latch 77 is mounted upon one of four vertical frame members 160 of a stationary vehicle seat frame 61 at the rear and to one side thereof which seat frame 61 is fastened to stationary structure 56 of the vehicle. Said vehicle seat frame also comprises horizontal cross frame members 170 and 94; the latter being a cylindrical rod about which the vehicle seat S pivots in its rearward movement; and horizontal longitudinal frame members 172, 85, 105, and 158, 159; the latter two members being top plates which serve to slidably guide the movement of the vehicle seat S. A rod 96 which is made fast to the bottom front of the vehicle seat S so as to move therewith is slidably supported on the frame members 85. The vehicle seat S has side plates 99 which also serve as guides for the sliding movement thereof by bearing against said side plates 158 and 159 of said seat frame 61.

The side of the vehicle seat S where the latch 77 is located carries at the rear thereof a short length of angle plate 150 made fast to the respective side plate 99 which plate 150 has formed therein a plurality of depending detents 152 any one of which is capable of entering a cavity 101 in a vertically moveable member 81 to latch the vehicle seat S in any one of selected longitudinal positions against movement. Said member 79 is carried by and moves with said member 81. When actuated the member 81 slides vertically on a pin 82 against the urging of a compression spring 84 and is guided in its sliding movement by a pair of spaced apart bars 90 bolted at the lower ends thereof, as at 83, to said member 81 and slidable via the upper ends thereof in tracks formed in part by members 92 made fast to said frame 86 at the upper end and on the opposite sides thereof. Said member 81 pivotally carries, as at 87, said member 79 which is spring pressed by a compression spring 111 (in a clockwise direction as viewed in FIGS. 8 and 10) against a vertical shoulder formed on the member 81.

When the member 79 is struck by the lever 74 in the power stroke of the fluid powered power unit 32 it drives the member 81 downwardly and free of the engaged detent 152 as shown in FIG. 10 to initiate movement of the vehicle seat S. In driving the member 81 downwardly the lever 74 continues to move in a counter-clockwise direction and disengages from the membemr 81 which latter then returns to its rest or up position before the lever 74. At such time as the lever 74 returns to its rest or up position the free end thereof is capable of pushing against the member 79 above the latter's pivot connection 87 causing the latter to rotate counter-clockwise against the urging of the spring 111 to permit the free end of the lever 74 to pass over and above the member 81 so that said lever 74 can again assume its rest or up position.

Figure 3:
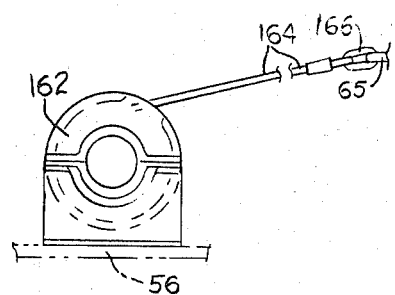
FIG. 3 is a fragmentary side elevational view of a part of the structure of FIG. 2 taken on the line 3—3 thereof.

When unlatched upon collision of the vehicle, the vehicle seat S is power actuated rearwardly by said vehicle seat power unit 80 which includes a conventional spring powered belt retractor 162 (FIGS. 2 and 3) mounted on stationary parts 56 of the vehicle and having a reel wound retracting belt 164 fastened to an anchor 165 made fast to the center rear of said vehicle seat S. The retractor 162, except for size and power, is substantially the same in structure and function as a pair of spring powered belt retractors 125 (FIGS. 14 and 15) to which reference will later be made for power actuating the vehicle safety curtain 14. In the case of the retractor 162 a strong tension spring 98 assists the same in pulling the vehicle seat S rearwardly and for this purpose said spring 98 has its center connected to said rod 94 via a ring 93 which encircles said rod 94 and has its ends connected to said rod 96 via a pair of transversely spaced apart rings 91 which encircle said rod 96. During the power stroke of the retractor 162, and in assistance therewith, said spring 98 forcefully contracts to pull the vehicle seat S rearwardly during which movement said vehicle seat S slides both on the rod 94 and via the rod 96 on the members 85 until the occupied weight thereof rocks said vehicle seat S so that the rear end thereof moves downwardly and rearwardly about said rod 94. This rocking of said vehicle seat S is by gravity, in the instance, and assists both the retractor 162 and the spring 98 in pulling the seat S rearwardly and in moving said occupant out of the way of the vehicle safety curtain 14 before the latter is power actuated into its catch or safety position. A rubber cushion 73 which is supported upon a rearwardly projecting plate 71 fastened to suitable stationary structure 56 is struck by the anchor 65 for said belt 164 to yieldably cushion the vehicle seat S in its final movement. If necessary, the belt retractor 162 and the spring 98 may be made, by well known means, to be resisted manually by the occupant of the vehicle seat S and the member 81 may be made, by the same last-mentioned manual means, to be manually moveable so as to clear the engaged detent 152 to allow the occupant to adjust the position of the vehicle seat S in respect to said frame 61.

A pair of transversely spaced apart hollow vertical stanchions 182 in the vehicle serve as the principal mounting structure for the safety curtain 14 and support, via suitable structure 112, a stationary cross-member 180 to which is affixed, as by rings 200, the ends of a plurality of safety belts 196, the opposite ends of which are affixed, as by rings 202, to a moveable cross-member 108 disposed directly below and in the same plane as the stationary cross-member 180. The moveable cross-member 108 is held against movement in an up stowage position at the roof of the vehicle by a pair of latch means 103 disposed at opposite ends thereof and mounted, via respective brackets 106, upon said structure 112. Each latch means 103 consists of an over-center mechanism comprising an arm 104 pivotally mounted, as at 105, on its respective bracket 106 and an over-center tension spring 121 which stretches over the pivot pin 105 and has its ends wrapped around pins 109 and 110 made fast, respectively, to said arm 104 and to said bracket 106. The over-center action of the pair of latch means 103 holds the arms 104 in an up position which arms 104 in turn hold via rollers on the ends thereof, the moveable cross-member 104 in its up position. The belts 196 may be stored between the cross-members 108 and 180 by individual spring powered reel wound belt retractors 198, as shown, or they may be held in a common substantially horizontal single loop position at the roof of the vehicle with a latched rod (not shown) holding the loops commonly taut. Said rod can also be unlatched by the cables 100 to fall free at the same time the latch means 103 are unlatched so as to release the belts 196 from their looped stored position at the roof of the vehicle. If the belts 196 are thus stored in a single loop position at the roof of the vehicle as described they may be advantageously strengthened by having a plurality of cross-belts (not shown) sewed thereto to strengthen the safety net 14.

The pair of latch means 103 are simultaneously actuated to a down position in respect to the brackets 106 by a pair of cables 100 which slide longitudinally in respective sheathes 102 held in stationary positions by suitable means (not shown) alongside said stanchions 182. Said cables 100 also operate under a pair of pulleys 101 mounted on the housings, respectively, for said belt retractors 125. The cables 100 are fastened via anchors 176 to the arms 104, respectively, and via anchors 178 to the vehicle seat S so that after a predetermined movement of the latter the moveable cross-member 108 is unlatched by the latch means 103 and simultaneously power actuated downwardly by the pair of belt retractors 125, the pair of belts 194 of which are fastened via a pair of connectors 186, respectively, to said moveable cross-member 108. The anchors 178 may be made, by well known means, to be adjustable so as to adjust the slack in the cables 100 so that the amount of movement of the vehicle seat S prior to actuation of the pair of latch means 103 can be varied to attain the optimum time interval for the particular hardware selected to practice my invention.

Each connector comprises a pair of arms 187, the front ends of which are fastened about the moveable cross-member 108 by being bolted together at opposite ends thereof, as at 190 and 192. Each lower arm 187 is directly connected by links 191 to the respective belt 194. The rear portion of each connector 186 is moveably contained in the hollow interior of the respective stanchion 182 while the intermediate neck portion thereof slides in a slot 184 formed in the front wall of said stanchion 182 when said connector 186 is pulled downwardly by its respective belt 194. To stabilize and guide the vertical sliding movement of the rear portion of each connector 186 in its respective stanchion 182 a pair of rollers 183 are provided which bear against opposite side walls of said stanchion 182. Each pair of rollers 183 is connected to opposite ends of respective structure 185 fastened to the rear portion of the respective connector 186. Near the end of its downward movement the moveable cross-member 108 strikes the upper rollers on a second pair of latch means 113 mounted, respectively, upon said stanchions 182 at the bottoms thereof at the floor of said vehicle. Said latch means 113 have respective arms 114. Each latch means 113 is constructed as an over-center mechanism like the corresponding latch means 103 and is normally in an up position so that its respective upper roller is struck by the downward movement of the moveable cross-member 108, whereupon the respective spring 121 moves over-center and throws the respective arm 114 clockwise into a down position as shown in FIG. 19 to hold and lock the cross-member 108 in its down position. The lower ends of the belts 196 move with the moveable cross-member 108 and become stretched taut in front of said occupant to form a safety net to safely catch said occupant and prevent him from going through the windshield or striking other parts of the vehicle.

In operation of my vehicle safety system when the trigger mechanism 30 is actuated as described upon collision of the vehicle my trigger actuated power unit 10 is actuated by the cable 166 pushing upon the platform 26 to initiate disconnection of the latch elements 42 and 45 from each other which sets off the respective power strokes of the spring and fluid powered power units 24 and 32, respectively, whereupon the piston rod 46 is forcefully retracted to pull, via the cable 67, upon the lever 74 to unlatch the seat latch 77, whereupon the vehicle seat S is forcefully pulled by both the tension spring 98 and the belt retractor 162 to move the occupant of the vehicle seat S both rearwardly and rockably backwardly and out of the way of the safety net 14. The rocking of the vehicle seat S takes place about a horizontal axis provided by the rod 94 so that the end of the vehicle seat S which is being pulled upon is pulled downwardly by gravity, in the instance. After a predetermined amount of movement of the vehicle seat S sufficient for the occupant or occupants thereof to clear the safety net 14 the pair of latch means 103 is unlatched by the cables 100 pulling downwardly upon the arms 104 which initiates the downward power actuation of the moveable cross-member 108 by the pair of belt retractors 125. The moveable cross-member 108 is locked in its down position by the action of the pair of latch means 113 and stretches the plurality of safety belts 196 in front of the vehicle seat S to form a safety net across the path the occupant would be thrown by inertia and thus safely catches and prevents harm to him.

The safety net 14 must be arranged to be thrown between the occupant of the vehicle seat S and the steering wheel and sufficiently in front of the latter to catch the driver before he strikes said steering wheel so that in order to clear the safety net 14 the driver of the vehicle as an occupant of the vehicle seat S must be pulled well clear of the steering wheel. It is contemplated that certain changes in a vehicle may be required on account of my invention such as providing room behind the vehicle seat S for it to be pulled and rocked rearwardly or providing a second power unit 10 of mine to pull the rear seat rearwardly at the same time that the front vehicle seat S is pulled rearwardly. Also it is contemplated that the piston rod 46 may be connected by another cable than the cable 69 to the linkage presently actuated by the vehicle brake pedal so that upon collision of the vehicle its brakes are applied by the fluid powered power unit 10 at the same time that the vehicle seat latch 77 is unlatched by the cable 69. The vehicle steering wheel may have to be reformed in respect to what is presently conventional. The safety net 14 takes care of the vast majority of vehicle occupants who do not use seat belts in spite of their widespread availability. Those who may still be protected by the safety net if, for any reason, in spite of their use of seat belts, they are thrown far enough by inertia.

It will thus be seen that there has been provided by my invention a vehicle safety system in which the object hereinabove set forth, together with many thoroughly practical advantages has been successfully achieved. While a preferred embodiment of my invention has been shown and described, it is to be understood that variations and changes may be resorted to without departing from the spirit of my invention as defined by the appended claims.

What I claim is:

1. In a vehicle safety system for achieving vehicle safety for occupants upon collision of the vehicle, vehicle safety means comprising means for applying a force on a vehicle seat so as to move it and any occupant thereof axially of the vehicle, means for latching said vehicle seat against said axial movement, a spring powered pulling means and a fluid powered pulling means, both said last-mentioned pulling means operative upon each other to augment their indvidual pulling forces, said last-mentioned pulling means capable of being latched against operation, means for latching both said last-mentioned pulling means against operation until a collision of the vehicle occurs, sensing means for sensing a collision of said vehicle, means responsive to said sensing means for simultaneously unlatching both said last-mentioned pulling means upon the happening of said collision, and means responsive to the operation of at least one of said last-mentioned pulling means to unlatch said vehicle seat so that the latter can be pulled axially of the vehicle.

2. Vehicle safety means as claimed in claim 1, said last-mentioned responsive means utilizing said fluid powered pulling means to unlatch said vehicle seat.

3. Vehicle safety means as claimed in claim 1, safety curtain means including a moveable safety curtain, means for storing said safety curtain in said vehicle, means capable of applying a force on said safety curtain so as to throw it across the path in which inertia throws said occupant upon the happening of said collision, means for latching said safety curtain against being thrown across said path, means for sensing movement of said vehicle seat, and means responsive to said last-mentioned sensing means for unlatching said safety curtain after a predetermined amount of movement of said vehicle seat so that said occupant is moved clear of said safety curtain before the latter can be thrown across said path.

4. Vehicle safety means as claimed in claim 3, means responsive to movement of said vehicle seat to unlatch said safety curtain.

5. Vehicle safety means as claimed in claim 3, said means for applying a force on said vehicle seat to move it and the occupant thereof axially of the vehicle constructed to apply a pulling force on said vehicle seat so as to pull said seat backwardly.

6. Vehicle safety means as claimed in claim 5, means rocking said seat backwardly as it is being pulled backwardly.

7. Vehicle safety means as claimed in claim 6, means for storing said safety curtain at the roof of the vehicle, and means applying a pulling force on said safety curtain so as to pull it downwardly in front of said vehicle seat.

8. Vehicle safety means as claimed in claim 7, means utilizing the rearward movement of said vehicle seat to unlatch said safety curtain.

9. Vehicle safety means as claimed in claim 8, means for latching the bottom of said safety curtain at the floor of said vehicle after the safety curtain has been pulled downwardly.

10. In a vehicle safety system for achieving vehicle safety for occupants upon collision of the vehicle, vehicle safety method comprising providing a force capable of moving a vehicle seat and any occupant thereof axially of the vehicle, latching said vehicle seat against said axial movement, providing both a spring powered pulling force and a fluid powered pulling force, both said last-mentioned pulling forces operative upon each other to augment their individual pulling forces, said last-mentioned pulling forces capable of being latched against operation, latching both said last-mentioned pulling forces against operation until a collision of the vehicle occurs, sensing a collision of said vehicle, simultaneously unlatching in response to said sensing both said last-mentioned pulling forces upon the happening of said collision, and utilizing the operation of at least one of said last-mentioned pulling forces to unlatch said vehicle seat so that the latter can be moved axially of the vehicle.

11. Vehicle safety method as claimed in claim 10, utilizing said fluid powered pulling force to unlatch said vehicle seat.

12. Vehicle safety method as claimed in claim 10, storing a safety curtain in said vehicle, providing a force capable of throwing said safety curtain across the path in which inertia throws said occupant upon the happening of said collision, said safety curtain capable of being latched against movement, latching said safety curtain against being thrown across said path, sensing movement of said vehicle seat, and unlatching in response to said last-mentioned sensing said safety curtain after a predetermined amount of movement of said vehicle seat so that said occupant is moved clear of said safety curtain before the latter can be thrown across said path.

13. Vehicle safety method as claimed in claim 12, utilizing movement of said vehicle seat to unlatch said safety curtain.

14. Vehicle safety method as claimed in claim 10, applying a pulling force on said vehicle seat so as to pull said seat backwardly.

15. Vehicle safety method as claimed in claim 14, rocking said seat backwardly as it is being pulled backwardly.

16. Vehicle safety method as claimed in claim 15, storing said safety curtain at the roof of said vehicle, and applying a pulling force on said safety curtain so as to pull it downwardly in front of said vehicle seat.

17. Vehicle safety method as claimed in claim 16, utilizing the rearward movement of said vehicle seat to unlatch said safety curtain.

18. Vehicle safety method as claimed in claim 17, latching the bottom of said safety curtain at the floor of said vehicle after the safety curtain has been pulled downwardly.

* * * * *